(12) United States Patent
Cummings et al.

(10) Patent No.: US 6,189,333 B1
(45) Date of Patent: Feb. 20, 2001

(54) REFRIGERANT FILTER FOR USE IN AN AUTOMOTIVE AIR CONDITIONING SYSTEM

(75) Inventors: Larry Donald Cummings, Clarence; Jing Zheng, Williamsville, both of NY (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/360,557

(22) Filed: Jul. 26, 1999

(51) Int. Cl.[7] .................................................. F25B 43/00
(52) U.S. Cl. .................................................. 62/474; 62/512
(58) Field of Search ....................................... 62/474, 512

(56) References Cited

U.S. PATENT DOCUMENTS

| | | | |
|---|---|---|---|
| 2,702,993 | * | 3/1955 | Harris ........................................ 62/474 |
| 4,255,940 | * | 3/1981 | Grahl et al. ............................ 62/324.3 |
| 4,266,408 | * | 5/1981 | Krause ...................................... 62/474 |
| 4,342,421 | | 8/1982 | Widdowson ........................ 236/92 B |
| 4,745,772 | * | 5/1988 | Ferris ....................................... 62/292 |
| 5,354,101 | | 10/1994 | Anderson, Jr. ........................... 285/25 |
| 5,467,611 | | 11/1995 | Cummings et al. .................... 62/299 |
| 5,562,427 | | 10/1996 | Mangyo et al. ....................... 417/313 |
| 6,023,940 | * | 2/2000 | Abbott et al. ........................... 62/504 |
| 6,044,649 | * | 4/2000 | Numoto et al. ......................... 62/114 |
| 6,058,711 | * | 5/2000 | Maciaszek et al. ..................... 62/3.2 |

* cited by examiner

Primary Examiner—William Doerrler
Assistant Examiner—Mark Shulman
(74) Attorney, Agent, or Firm—Patrick M. Griffin

(57) ABSTRACT

A refrigerant filter (40) designed for installation into a block fitting (10) of the type that detachably connects refrigerant lines (12,14) to an evaporator. The filter (40) includes a cylindrical mesh screen (42) and a supporting frame (44) that fits into the open end (30) of the liquid refrigerant supply (14) line before the supply line (14) is connected by the fitting (10) to the evaporator lines (16,18). The filter supporting frame (44) has an end plug (48) that fits closely into the line (14), assuring and all refrigerant flow is forced through the screen (42), without by passing the filter (40). The plug (48) also has a stop member (50) that both assures that the filter (40) is not over inserted at installation, and that the plug (48) is not ejected from the line (14) during operation.

2 Claims, 5 Drawing Sheets

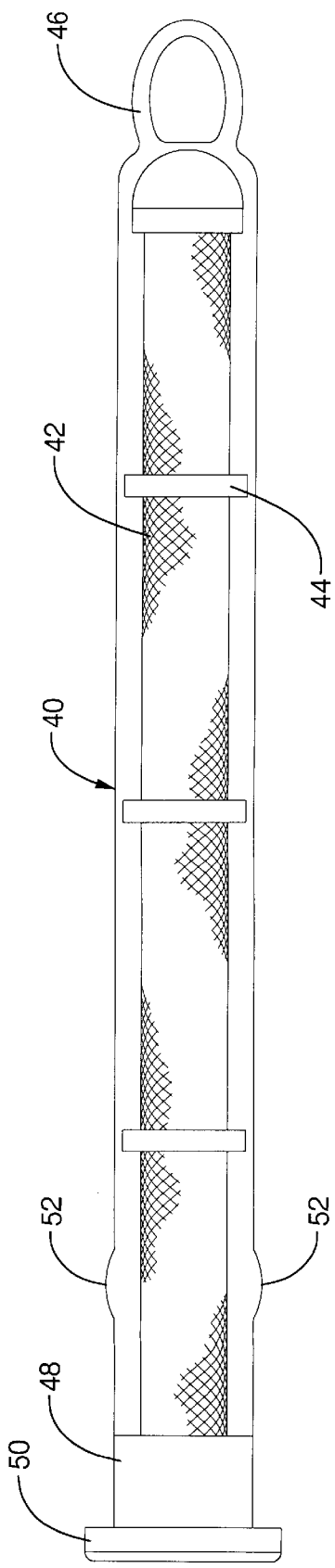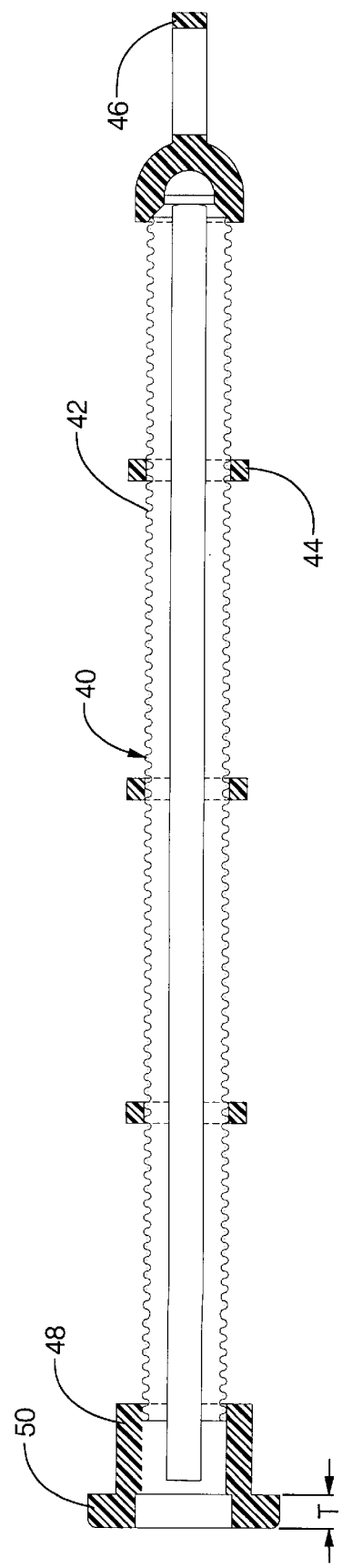

REFRIGERANT FILTER FOR USE IN AN AUTOMOTIVE AIR CONDITIONING SYSTEM

TECHNICAL FIELD

This invention relates to automotive air conditioning system block connectors, and especially to a refrigerant filter specifically designed to be incorporated therein.

BACKGROUND OF THE INVENTION

Automotive air conditioning systems can be divided roughly into two categories based on the type of expansion valve assembly used to expand and drop the pressure of the liquid refrigerant before it enters the evaporator. This distinction, in turn, determines the manner in which a system reserve of liquid refrigerant is stored, dried and filtered of contaminants. The subject invention relates especially to refrigerant filtering.

One common type of refrigerant expansion valve is a fixed, small diameter orifice, typically a brass tube held by a centering plug within the liquid refrigerant line. These are inexpensive, with no moving parts, but are obviously incapable of changing size to adapt to differing system demands. Such systems generally use a so called accumulator canister to store the refrigerant reserve with vapor only being pulled from the top of the canister to the compressor. Refrigerant drying desiccant bags can also be installed in the accumulator. Fixed orifice valves also provide a convenient location for a refrigerant contaminant filter screen, which can be secured to the centering plug to surround the orifice tube and filter the refrigerant as it flows through the tube.

The other basic type of expansion valve is an active, thermostatic expansion valve, in which the size of the expansion orifice can be actively varied, depending on system parameters and demands. An example may be seen in U.S. Pat. No. 4,342,421, which is often referred to as a TXV system. With a TXV system, it is most efficient if only liquid refrigerant be fed to the expansion valve, so it is convenient to store (and dry) liquid refrigerant reserve in a so called receiver-drier canister located just upstream of the valve. The more complex TXV valves, with their moving parts and small internal passages, are not convenient locations for direct incorporation of a refrigerant filter, which may be placed instead in the receiver-drier canister. As receiverdryers have become more compact, however, and sometimes integrated directly into the return header tank of the condenser, there is less room for filter installation. Moreover, a receiver canister is generally not easily opened or disconnected to allow a filter to be serviced or removed, if at all.

A recent U.S. Pat. No. 5,562,427, claims a refrigerant filter of a specific material and pore size, and discloses it in numerous possible locations, including the receiver, refrigerant line, and compressor housing. The filter design itself is not particularly amenable to handling, installation or removal, having several parts. In addition, every installation location disclosed would require some major modification to the existing air conditioning system and components.

It is generally necessary in any vehicle air conditioning system, or at least convenient, to be able to reversibly attach and detach both refrigerant lines (the liquid supply line into the evaporator, and the suction or gas line out of the evaporator) from the evaporator, both for initial installation and for later servicing or removal of the evaporator. This is conveniently done with block connections, in which two or more blocks or plates are bolted together to simultaneously join four line ends (two ends for each line) in sealed communication. In one block connector design, the line ends are solidly brazed down into bores formed in end fittings, which are then bolted together into bores in a block, as in U.S. Pat. No. 5,354,101. In another, the four line ends are instead pulled toward one another and into a central block by two side plates, which act as clamps. The line ends are not solidly fixed to the side plates, however. Instead, the side plates bear against the outside of enlarged beads on the lines, which are set back from the terminal edges of the line ends. In either case, when the block fitting is disconnected, the ends of the lines, or at least the ends of the fittings to which the lines are fixed, are visible and accessible. One design in which the filter of the invention may be conveniently installed is disclosed in U.S. Pat. No. 5,467,611, which uses a central block and side plates.

SUMMARY OF THE INVENTION

The invention provides a refrigerant filter design specially designed to be incorporated into the type of block fitting described above, with no substantial modification to the system components. The filter is simple and unitary in design, and can be installed or removed simply by making or breaking the block fitting.

In the preferred embodiment disclosed, the bottom surface of block bore and the edge of the cylindrical end of a liquid refrigerant supply line detachably clamped therein has a predetermined axial clearance. Liquid refrigerant flows through and out of the end of the liquid line, into the bore and through the central block, into a continuation of the line on the other side. The refrigerant filter, in a preferred embodiment, has a cylindrical filter screen, with a closed end upstream to the flow, and an open downstream end. The outside of the screen is supported along its length by a molded plastic, ribbed frame, which, in general, makes a close fit inside the open end of the liquid line. Specifically, a cylindrical end plug at the downstream end of the frame is inserted closely into the open line end until an annular collar abuts the line's terminal edge. The collar's thickness is close to the axial clearance noted above. In addition, in the embodiment disclosed, a resilient loop at the upstream end of the support frame plugs into a necked down portion of the line, helping to center the filter frame within the line.

Given the relative dimensions described above, the filter can be installed in the line with a simple press fit, and the annular collar acts as a stop to prevent over insertion. Next, the line is clamped into the block bore in the usual way. When refrigerant flows through the line toward the fitting, it is forced to flow through the screen, because of the close press fit with the frame plug. Since the collar thickness prevents the close fitting cylindrical plug from pulling out of the line end, flow cannot by pass the filter screen. In addition, the resilient end loop acts to prevent chatter. Removing or servicing the filter involves no more than a breaking of the block fitting and pulling the frame out at the accessible collar. No substantial structural changes to the system or any pre existing component are needed to accommodate the filter, and no installation or removal steps are necessary beyond those already built into the system.

BRIEF DESCRIPTION OF THE DRAWINGS

FIG. 3 is a side view of a preferred embodiment of the filter of the subject invention;

FIG. 4 is a cross section of FIG. 3;

DESCRIPTION OF THE PREFERRED EMBODIMENT

Figure 1:
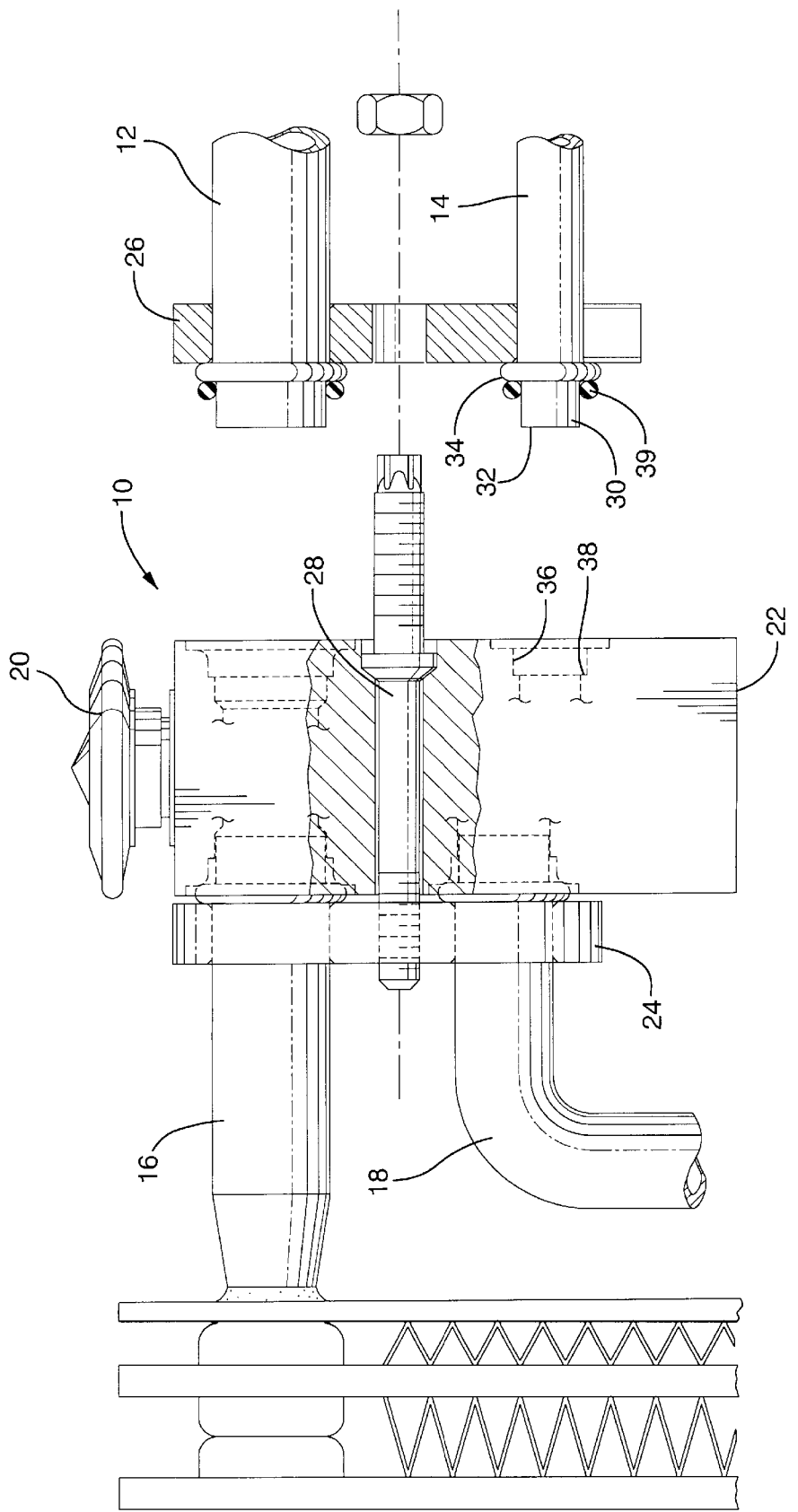
FIG. 1 is a partially sectioned view of a TXV block fitting in which the filter of the subject invention is incorporated.
Figure 2:
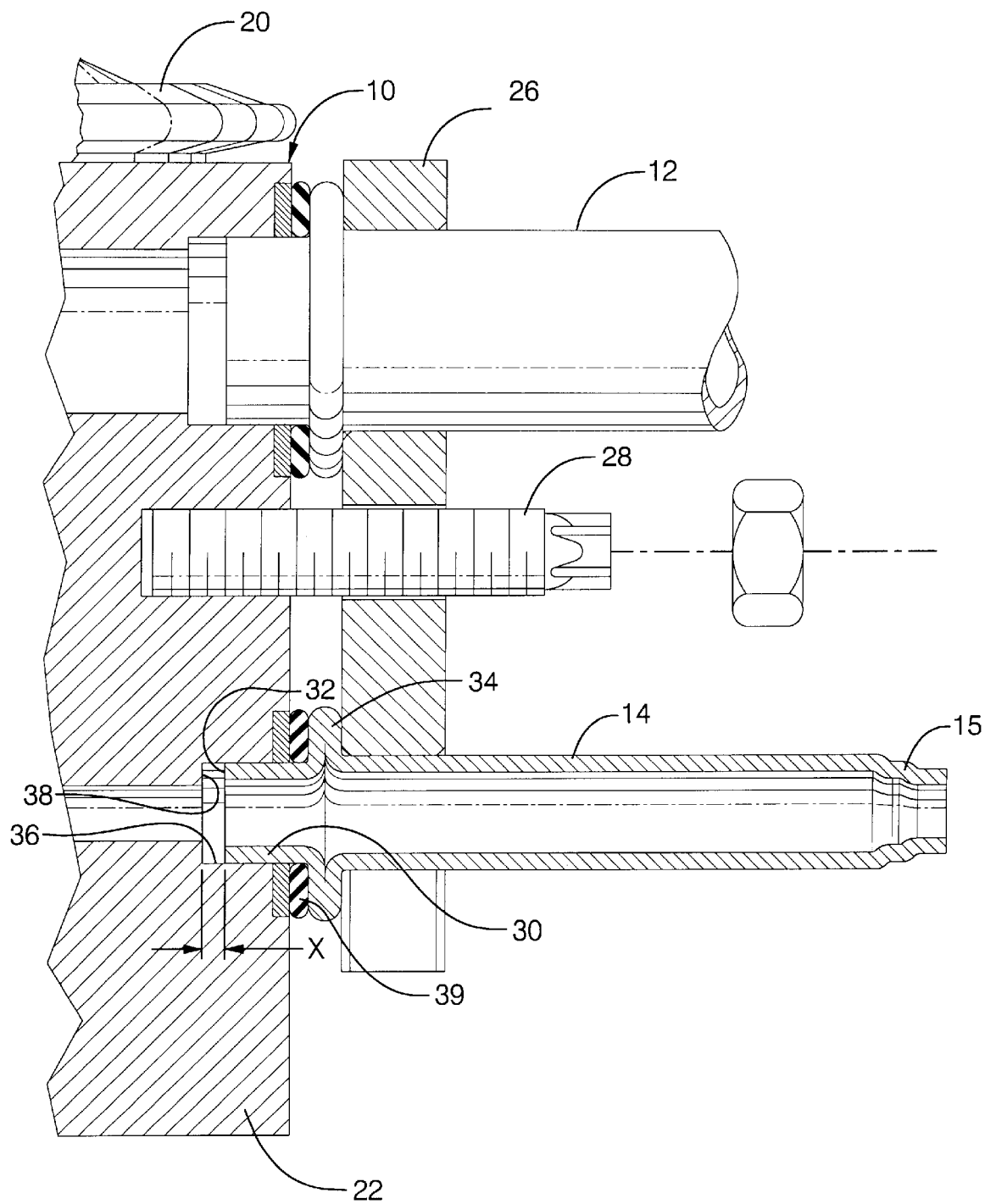
FIG. 2 is an enlargement of the block fitting as the lines are being clamped in place.

Referring first to FIGS. 1 and 2, an automotive air conditioning system includes block fitting, indicated generally at 10, a larger diameter suction line 12, and a smaller diameter liquid refrigerant supply line 14. The only structural difference from a conventional system, in the embodiment disclosed, is that line 14 is necked down locally to a smaller diameter at 15, for a purpose described below, which has no effect on the structure or operation of the block fitting 10. Fitting 10 is the mechanism that connects lines 12 and 14 to an evaporator outlet 16 and inlet 18, respectively. The liquid refrigerant from line 14 arrives under pressure from a non illustrated receiver/dehydrator, and is forced through a TXV valve, the protruding top of which is visible at 20. The liquid refrigerant is thereby lowered in pressure and expanded to a cold vapor/mist before entering evaporator inlet 18. Valve 20 is conveniently housed within a large, machined aluminum block 22, and the two lines 12 and 14 as well as the inlet 18 and outlet 16 are simultaneously clamped into block 22 by side plates 24 and 26, by a single central bolt 28. Further detail on block fitting 10 may be found in U.S. Pat. No. 5,467,611 referred to above. What is most relevant to the invention here is the configuration of the end of liquid line 14, and its attachment to block 22. Specifically, liquid line 14, being cylindrical, has an open cylindrical end 30, with a circular terminal edge 32 that is axially spaced from an upset bead 34. Supply line end 30 is clamped into a close fitting cylindrical block bore 36, which has a bottom surface 38 that has a predetermined axial clearance X from the line edge 32. Line end 30 is connected by clamping it into bore 36 with side plate 26, which bears on the outside of bead 34 while an O ring 39 is compressed against the inside of bead 34. More specifically, then, X can be considered the smallest axial clearance that exists, accounting for the inevitable tolerances in the relative locations of edge 32, bead 34, and the bottom surface depth of bore Referring next to FIGS. 3 and 4, a preferred embodiment of a refrigerant filter made according to the invention is indicated generally at 40. Filter 40 comprises a cylindrical filter screen 42, closed at its upstream end, and open at its downstream end. Filter screen 42 has a diameter less than the line 14, and consists of a nylon mesh or other material of the proper mesh size to trap most of the expected contaminants. The diameter and mesh size of screen 42 allow for free refrigerant flow, as illustrated below. Screen 42 is not structurally stiff, but is supported along its length by a plastic, rigidly molded, open ribbed support frame 44, which surrounds screen 42. At its upstream end, frame 44 has in integrally molded, closed loop 46, which is sufficiently thin to be flexible, and which has a greatest width just less than the reduced diameter of necked down line area 15. At its downstream end, frame 44 has an integrally molded, hollow but rigid cylindrical end plug 48, which has an outer diameter closely matched to the inner diameter of liquid line open end 30, and an inner diameter large enough to not restrict the total refrigerant flow in line 14. Plug 48 merges into an integral, annular collar 50, which has an outer diameter equal to the end of liquid line end edge 32. The axial thickness T of collar 50 is slightly less than the predetermined axial clearance X defined above. A pair of diametrically opposed shallow protuberances 52 molded to the outside of frame 44 coincide with the axial location of line bead 34.

Figure 5:
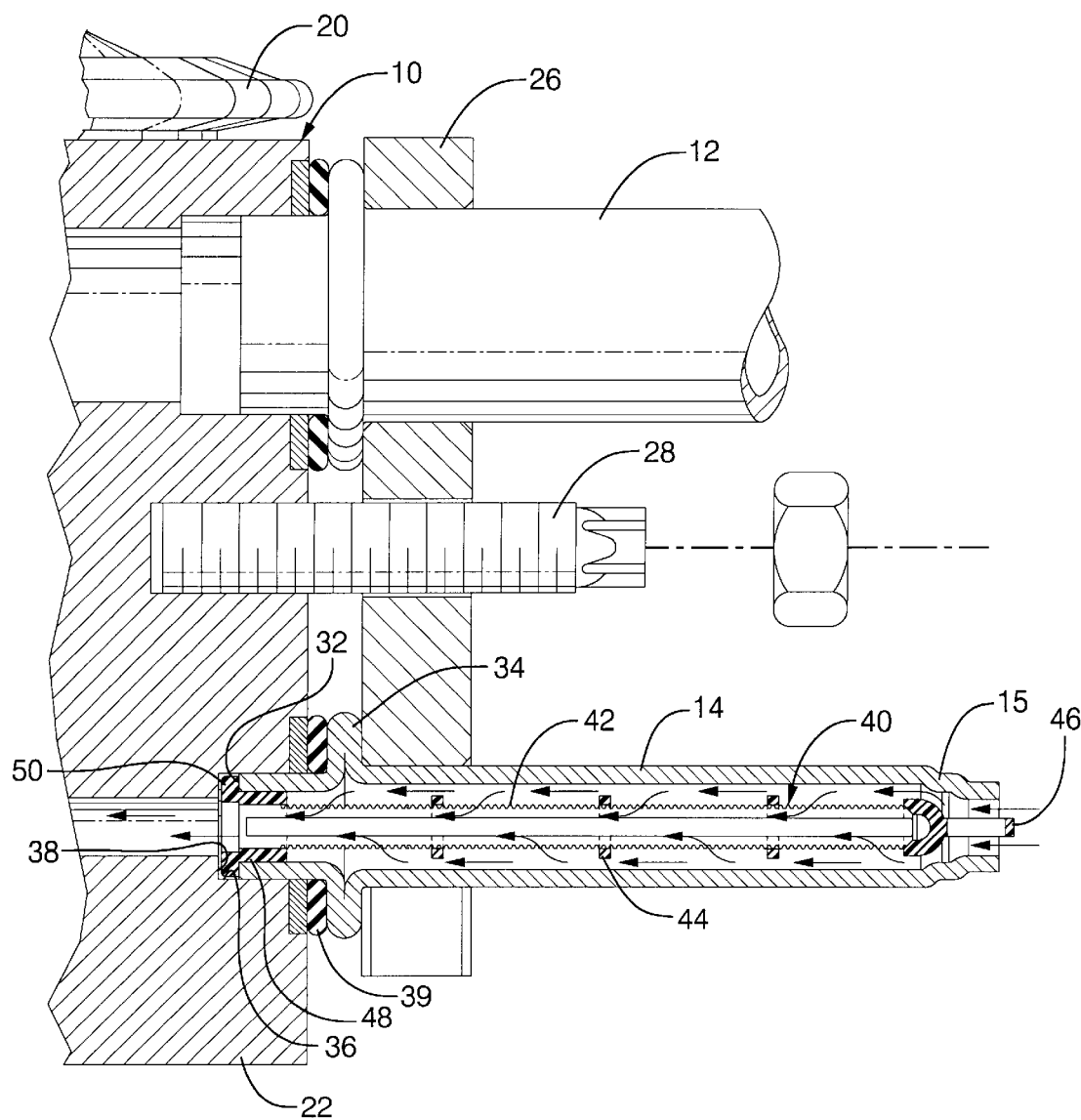
FIG. 5 is a view of the filter as illustrated in FIG. 3, installed, and showing the refrigerant flow.
Figure 6:
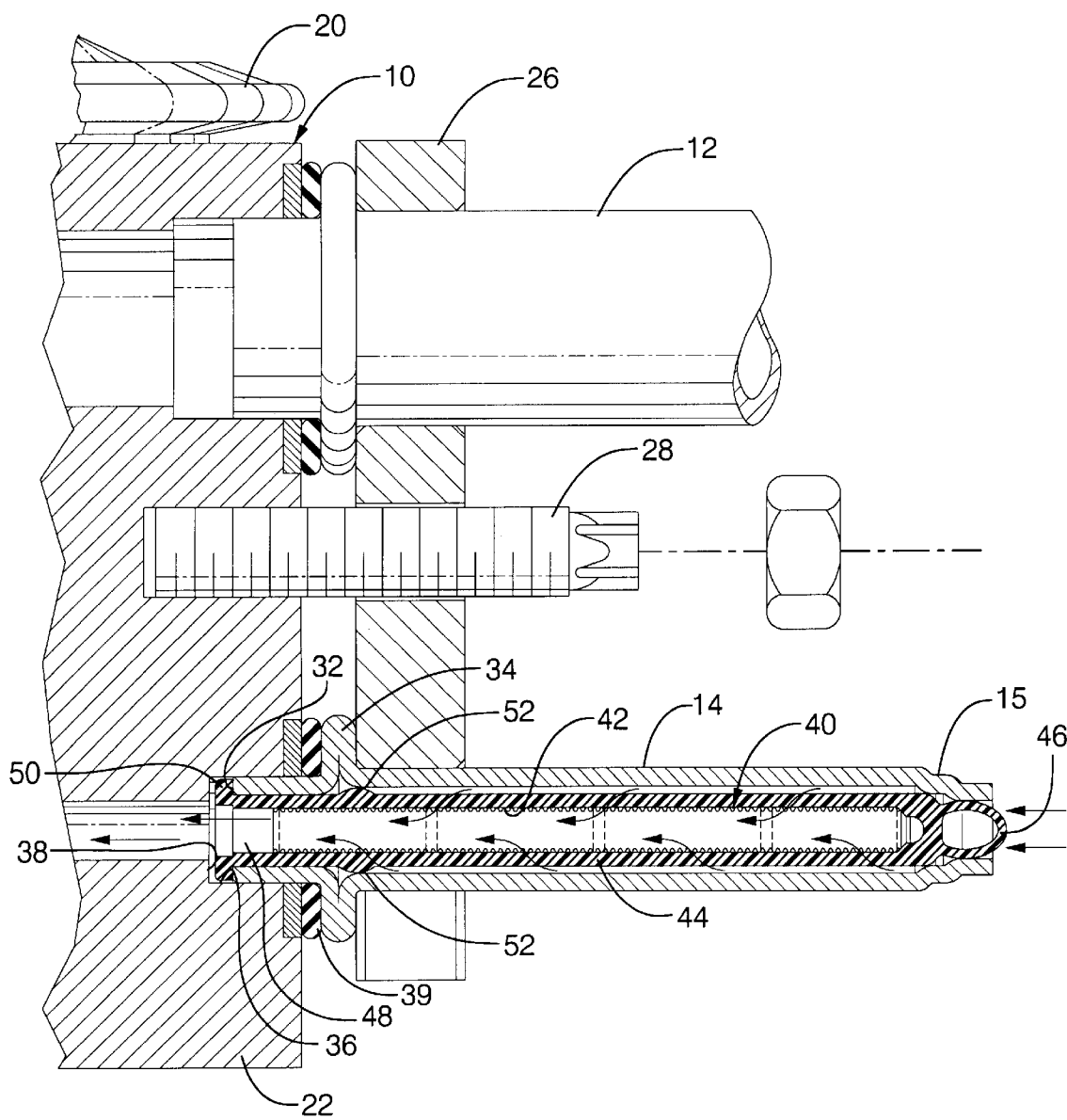
FIG. 6 is a view like FIG. 5, but showing the filter as illustrated in FIG. 4.

Referring next to FIGS. 5 and 6, filter 40 is installed in the same block fitting 10 referred to above, with the same basic components, which are accordingly given the same numbers. Filter 40 is installed by inserting it into the liquid line open end 30, which can be done only in the proper direction, given the diameter of collar 50. Collar 50 acts as a stop to prevent over insertion when it contacts the line end edge 32, just as flexible end loop 46 axially inserts into the necked down area 15 and the protuberances 52 pop past the inside of bead 34. The loop 46 is radially inwardly compressed slightly within the necked down area 15, but its thin, open construction prevents if from blocking flow. Then, side plate 26 is installed to clamp both lines 12 and 14 into place, as usual. The relationship of T and X described above assures that the collar 50 will not bottom out on bore bottom surface 38 and prevent the o ring 39 from compressing fully. In operation, as refrigerant is forced down line 14, it flows axially downstream through the radial gap between the inner surface of line 14 and screen 42, radially inwardly through screen 42 and ultimately axially out through the hollow end plug 48 and through fitting 10. The close fit of the outside of plug 48 with liquid line open end 30 assures that flow cannot by pass the filter screen 42. Furthermore, the same relation of X and T described above assures that, even there is significant axial clearance between the bore bottom surface 38 and collar 50, and if the flow force is enough to unseat the protuberances 52, the collar 50 it will engage long before plug 48 can be ejected out of the line end 30. Therefore, continued refrigerant filtering is assured. Quiet operation is maintained by the resilient centering action of the flexible end loop 46 compressed within the necked down line area 15. In the event that the filter screen 42 becomes plugged, removal and replacement involves no more than the breaking of the block fitting 10, and extraction of the old filter 40 by pulling out on the accessible collar 50. The detachment feature that is already built into the fitting 10 serves for filter installation and removal with no significant changes to any component.

Variations in the preferred embodiment could be made. The end loop 46 could be eliminated, as well as the necked down area 15 in the line 14, and features like extra protuberances toward the upstream end of the frame 44 could be provided instead for centering and bracing the filter 40 against vibration. Or, the entire outer surface of frame 44 could be manufactured so as to make a closer fit with the inner surface of line 14, so as to support itself against vibration. Collar 50 need not extend a full 360 degrees, but could be reduced to something like one or more relatively narrow tabs, which would still provide an over insertion stop against the terminal edge of the cylindrical line end 30. The full collar 50 is stronger, however. Therefore, it will be understood that at it is not intended to limit the invention to just the embodiment disclosed.

What is claimed is:

1. In an automotive air conditioning system block fitting of the type having a liquid refrigerant supply line a cylindrical end of which is removably attached to a block bore with a predetermined axial clearance between the terminal edge of the supply line cylindrical end and a botton surface of the block (36), a refrigerant filter removably installed in the end of said liquid supply line (14), comprising, a generally cylindrical filter screen having a closed upstream end and an open down stream end, and an outer diameter less than said supply line;

a rigid filter screen support frame surrounding the outside of said filter screen and having a cylindrical end plug that makes a close press fit within the cylindrical end of said supply line and an annular collar on said plug having an outer diameter substantially equal to the outer diameter of said supply line terminal edge, with the axial thickness of said annular collar being not greater than said predetermined axial clearance and extending radially outwardly far enough to overlap with said supply line terminal edge, whereby said filter can be removably installed within said supply line by inserting said end plug into said supply line cylindrical end until said collar substantially abuts said terminal edge and then attaching said supply line, after which, liquid refrigerant flowing through said supply line is forced to flow through said filter screen, without bypassing around said support frame plug and collar, by virtue of the axial thickness of said collar relative to said axial clearance.

2. A refrigerant filter according to claim 1, further characterized in that said frame has a flexible loop integrally molded at its upstream end which is slightly radially compressed by the inner surface of said refrigerant supply line when said filter is installed.

* * * * *